United States Patent [19]

Yu

[11] Patent Number: 5,340,027

[45] Date of Patent: Aug. 23, 1994

[54] PRESSURE-COMPENSATED SELF-FLUSHING DRIPPER

[76] Inventor: Michael Yu, 1270 Shakespeare Dr., Concord, Calif. 94521

[21] Appl. No.: 81,782

[22] Filed: Jun. 21, 1993

Related U.S. Application Data

[63] Continuation-in-part of Ser. No. 905,022, Jun. 26, 1992, Pat. No. 5,279,460.

[51] Int. Cl.⁵ .................... A01G 25/02; B05B 15/02
[52] U.S. Cl. ......................... 239/106; 239/276; 239/533.13; 239/542; 239/547; 137/513.5; 137/519.5
[58] Field of Search ............... 239/542, 547, 104, 106, 239/114, 123, 533.1, 533.13, 464, 468, 276; 248/61; 137/513.5, 519.5, 460

[56] References Cited

U.S. PATENT DOCUMENTS

| | | | |
|---|---|---|---|
| 1,164,613 | 12/1915 | Jewell | 248/61 |
| 1,615,010 | 1/1927 | Gerding | 239/468 |
| 2,417,269 | 3/1947 | Robertson | 248/61 |
| 3,727,635 | 4/1973 | Todd | 137/519.5 |
| 3,746,263 | 7/1973 | Reeder et al. | 239/542 |
| 3,762,651 | 10/1973 | Condolios | 239/468 |
| 3,841,349 | 10/1974 | Todd | 239/542 |
| 3,873,031 | 3/1975 | Reeder et al. | 239/542 |
| 4,100,940 | 7/1978 | Spears | 239/542 |
| 4,173,308 | 11/1979 | Savvides | 239/464 |
| 4,256,262 | 3/1981 | Rosenberg et al. | 239/276 |
| 4,687,143 | 8/1987 | Gorney et al. | 239/542 |
| 4,726,527 | 2/1988 | Mendenhall | 239/542 |
| 4,966,328 | 10/1990 | Neeman | 239/276 |
| 5,048,462 | 9/1991 | Hostetler | 248/61 |
| 5,158,231 | 10/1992 | Christen et al. | 239/276 |

FOREIGN PATENT DOCUMENTS

| | | | |
|---|---|---|---|
| 2607658 | 6/1988 | France | 239/542 |
| 269540 | 11/1929 | Italy | 239/468 |

*Primary Examiner*—Karen B. Merritt
*Attorney, Agent, or Firm*—Baker & Botts

[57] ABSTRACT

The dripper and mini-spray include an inlet and an outlet coupled to a housing which defines a substantially spherical, ellipsoidal, or cylindrical chamber. The chamber houses a ball which can roll about the chamber freely, but which is too large to exit through either the inlet or outlet. A whirlpool is caused by water or other liquids entering the chamber through the inlet due to the particular orientation and position of the inlet and the shape of the chamber. The whirlpool flushes debris from the chamber and pushes the ball around the chamber for a predetermined period of time. The ball then rests against the outlet to substantially obstruct the passageway out in a pressure-compensated manner.

21 Claims, 4 Drawing Sheets

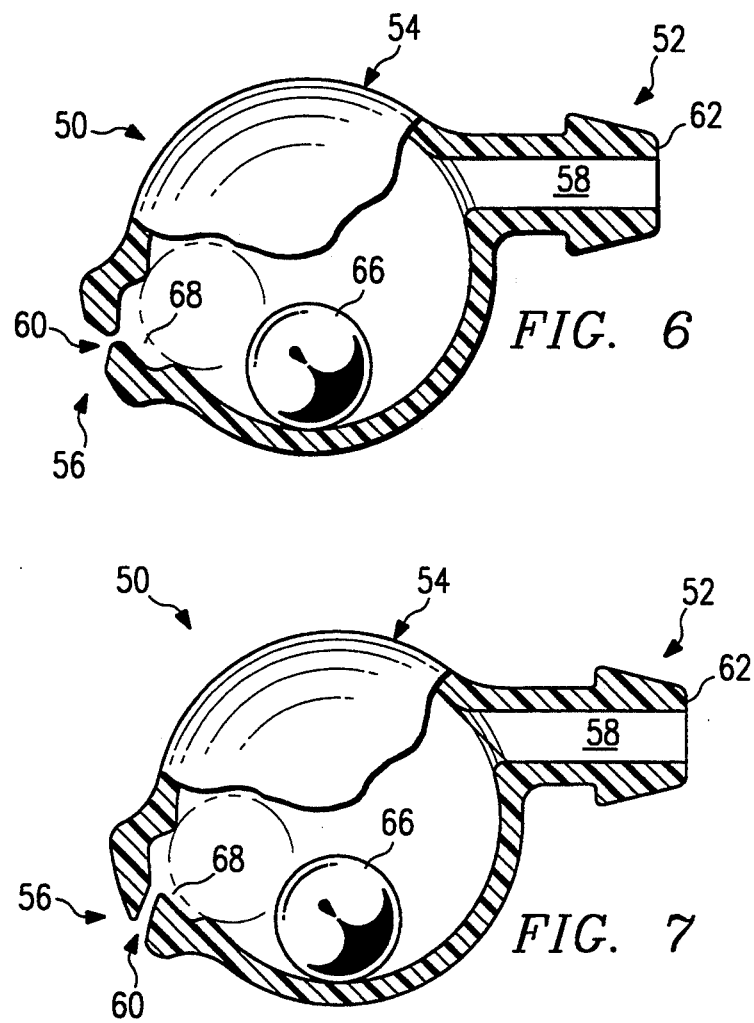
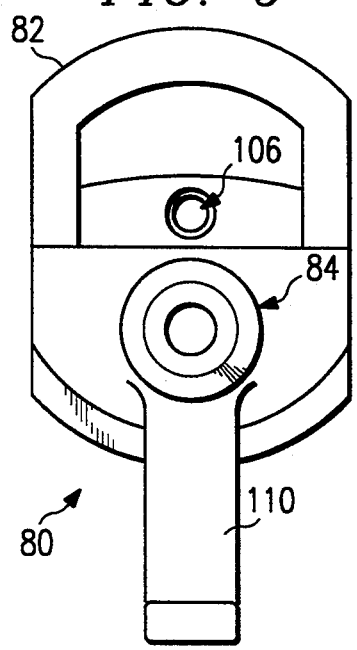
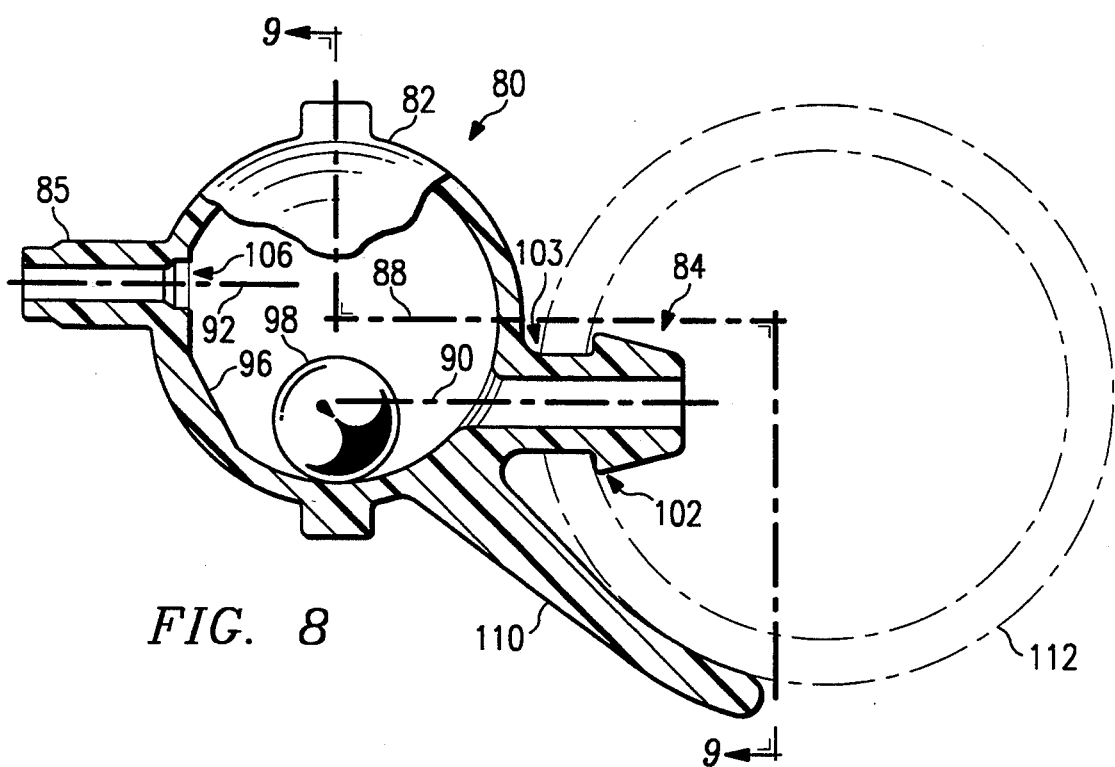

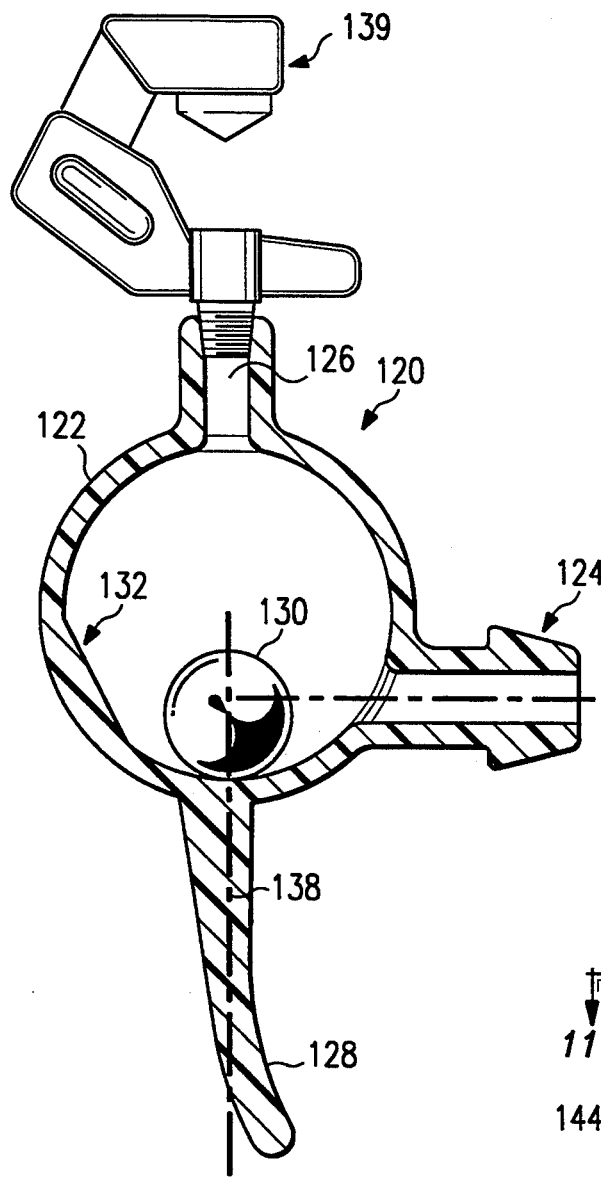
FIG. 10
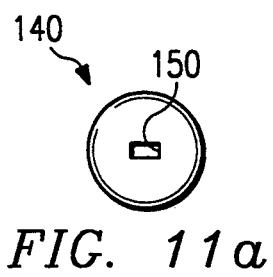
FIG. 11a
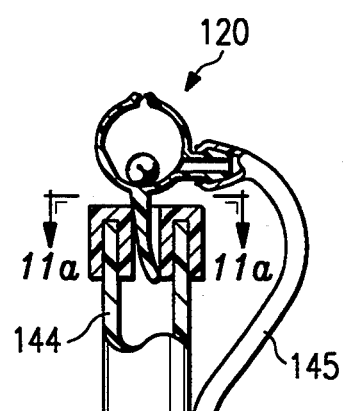
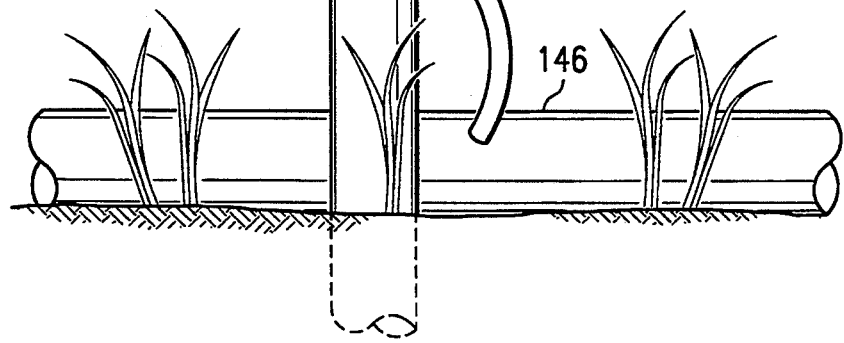
FIG. 11

PRESSURE-COMPENSATED SELF-FLUSHING DRIPPER

RELATED APPLICATIONS

This application is a continuation-in-part of patent application Ser. No. 07/905,022, filed Jun. 26, 1992, entitled "Pressure-Compensated Self-Flushing Dripper and Mini-Spray" by Michael Yu, now U.S. Pat. No. 5,279,460; this application is also related to patent application Ser. No. 08/024,182, filed Feb. 26, 1993 entitled "Irrigation Hose Hanger" also by Michael Yu, which is a continuation-in-part of patent application Ser. No. 07/991,727, filed Dec. 17, 1992, entitled the same, also by Michael Yu, now abandoned, which is a continuation-in-part of patent application Ser. No. 07/924,191, filed Aug. 3, 1992, entitled the same, also by Michael Yu, now abandoned, which is a continuation-in-part of patent application Ser. No. 07/834,149, filed Feb. 10, 1992, entitled the same, also by Michael Yu, now abandoned.

TECHNICAL FIELD OF THE INVENTION

This invention relates in general to the field of irrigation systems. More particularly, the present invention relates to a pressure-compensated self-flushing dripper and mini-spray.

BACKGROUND OF THE INVENTION

In the field of irrigation systems, the drip system has become one of the most widely used water delivery methods. The drip system is advantageous over other irrigation methods mainly because it delivers water and/or fertilizer only to those spots where it is needed. Not only is water consumption decreased, but the crop benefits for a number of reasons. Incidents of mildew and other undesirable fungus are minimized since the water is only delivered to the feeder roots of each plant. Weeds in the field are also discouraged because surface soil is mostly dry. The drip system is especially preferred when the planting field is not level, such as a hillside.

In conventional drip systems, water is carried in drip hoses generally along rows of plantings. At the location of each plant, a dripper or drip head is inserted into the hose to form a conduit. The generally hollow dripper thus allows water to flow into the dripper and dispense the water one drop at a time. However, due to the relatively small size of the dripper, its water delivery passage and openings are prone to obstruction by sand, soil, debris, algae and bacterial matter that have accumulated in the system. The farm or orchard operator must therefore examine each dripper frequently to ensure each is functioning properly. If a plugged dripper is found, it must be removed from the hose to be cleaned or replaced. It is obvious that this is an extremely time-consuming process since a typical farming operation or orchard may employ thousands of such drippers in its irrigation system.

The restoration process is also not without complications. The intake passage of a conventional dripper is equipped with an annular barb that effectively anchors against the inside wall of the hose when the intake passage and annular barb is pierced and inserted into the hose. The removal therefore requires pulling out the dripper by force which also enlarges the size of the drip hole and weakening the structure. The reinserted dripper thus has a weakened area to anchor against. If the farm or orchard operator had chosen not to turn the water off before undertaking this task, the water gushing out of the dripper hole makes it even more difficult to return the dripper to the hole. It is also easy to see that repeated insertion and removal of a dripper will eventually enlarge the hole and weaken the surrounding area to such an extent that it will not hold the dripper effectively. The water pressure in the hose may eventually force the dripper out of the enlarged hole.

In addition, where the soil is sandy, it is desirable to wet a larger area of the soil so that the feeder root system has access to an ample supply of water. A conventional drip head is not able to deliver water in such a manner.

Accordingly, it is desirable to employ a dripper and a mini-spray in an irrigation system that effectively maintains an unobstructed passageway. More particularly, such a dripper should remain unobstructed by soil, sand, algae, bacterial matter and other debris without demanding any change in the operation of the irrigation system. The employment of this improved dripper would greatly enhance the operation of any irrigation system in terms of time and cost.

SUMMARY OF THE INVENTION

In accordance with the present invention, a pressure-compensated self-flushing dripper is provided which substantially eliminates or reduces disadvantages and problems associated with prior drippers.

The dripper includes an inlet and an outlet coupled to a housing defining a substantially spherical chamber. The chamber houses a ball which can roll about the chamber freely, but which is too large to exit through either the inlet or outlet.

BRIEF DESCRIPTION OF THE DRAWINGS

For a better understanding of the present invention, reference may be made to the accompanying drawings, in which:

FIG. 6 is a fragmentary elevational view of a preferred embodiment of the mini-spray;

FIG. 7 is a fragmentary elevational view of another preferred embodiment of the mini-spray;

FIG. 8 is a fragmentary elevational view of a preferred embodiment of the dripper with a reflector pad and lever arm;

FIG. 9 is a cross-sectional view of the dripper taken along line 9—9 in FIG. 8;

FIG. 10 is a fragmentary elevational view of a preferred embodiment of the mini-spray with a reflector pad and lever arm;

FIG. 11 is an elevational view of the mini-spray in operation;

FIG. 11a is a top view of the mini-spray stake fitting;

DETAILED DESCRIPTION OF THE INVENTION

Figure 1:
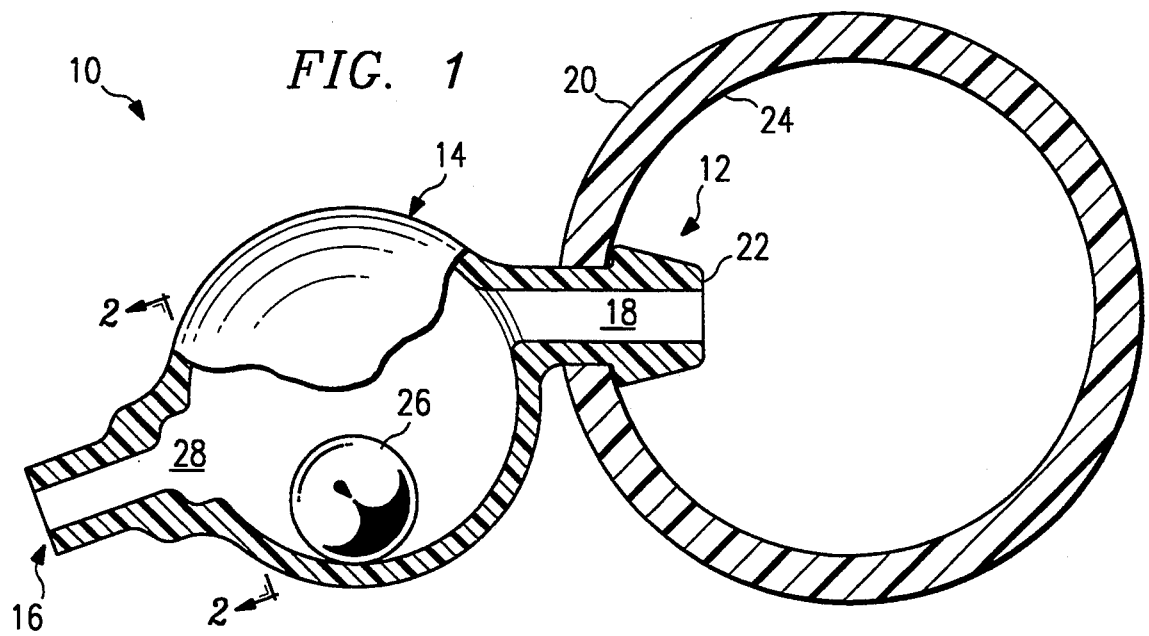
FIG. 1 is a fragmentary elevational view of a preferred embodiment of the dripper.

With reference to the drawings, FIG. 1 illustrates a preferred embodiment of a pressure-compensated self-flushing dripper, indicated generally at 10 and constructed according to the teaching of the present invention. Dripper 10 is generally used in a drip irrigation system in conjunction with an array of irrigation hoses to deliver water to each individual plant in a farm or tree in an orchard.

Dripper 10 is generally constructed of three main constituents: an inlet 12, a dripper housing 14, and an outlet 16. Inlet 12 defines a narrow passageway 18 that receives water or other liquids retained in an irrigation hose or piping 20. Inlet 12 includes an annular barb structure 22 which effectively anchors against an inner wall 24 of irrigation hose 20. Inlet 12 is coupled to dripper housing 14 so that passageway 18 leads directly into a space defined by dripper housing 14. The manner in which inlet 12 is coupled to housing 14 is described in more detail below in conjunction with FIG. 5.

Figure 12:
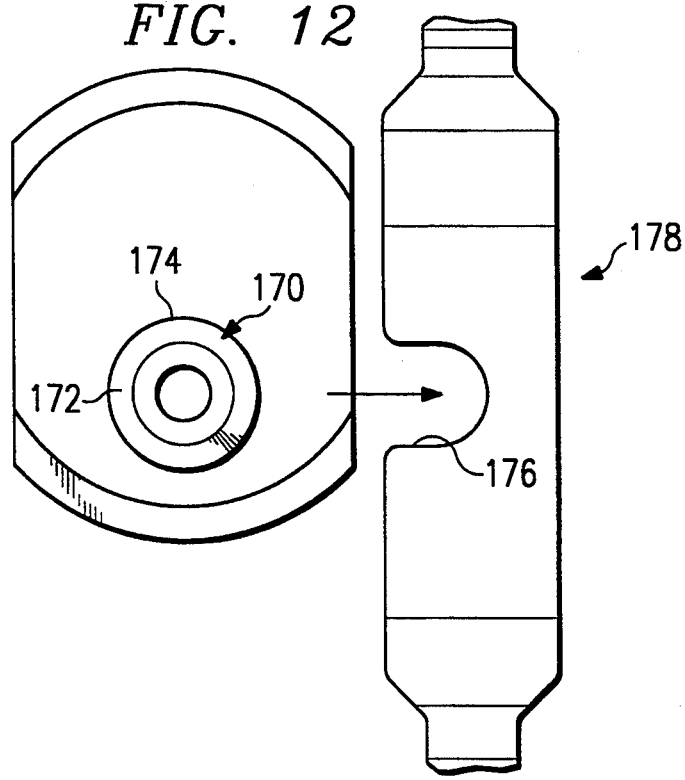
FIG. 12 is a frontal view of the dripper for clipping into the irrigation hose hanger.

Dripper housing 14 generally defines a spherical, cylindrical or ellipsoidal chamber and houses a generally spherical dripper ball 26. In particular, dripper housing 14 may be shaped like a flattened drum or a sphere having two flattened sides, as shown in FIGS. 9 and 12. The housing outer wall may also be spherical or ellipsoidal in shape. Dripper ball 26 is free to roll about inside dripper housing 14 and is too large to exit through either inlet 12 or outlet 16. Dripper ball 26 is preferably constructed of synthetic elastomer materials such as EPDM (amethylene propylene polymer) or polyurothm. In general, factors important for determining the material are, in no particular order, durability, flexibility, hardness, specific gravity, and slickness. The inside wall of dripper housing 14 is substantially smooth and free of obstructions to the movements of dripper ball 26.

Outlet 16 is coupled to dripper housing 14 generally on an opposed site from inlet 12. Outlet 16 defines another narrow passageway through which water may flow. An additional cradle-like feature 28 is defined where outlet 16 meets dripper housing 14. In general, the ratio between cradle opening diameter and dripper ball diameter is preferably between 1:1.4 to 1:2.4. It is preferable that cradle 28 is constructed such that a relatively small area comes into contact with ball 26 when it rests against cradle 28. This is achievable when cradle 28 has a generally sharp lip rather than a gradually sloping lip, as seen in FIG. 1. During the drip cycle, the water goes through the minute two stage opening 30 into the cradle 28. Because the opening size is so small (generally less than half a millimeter), it will create over ten times the pressure than the irrigation line pressure. This extreme pressure will turn the water through the two stage opening 30 into a high velocity mist as it reaches the cradle or reservoir 28. The cradle 28 is designed to absorb the energy and change the fine mist to larger drops of water for drip irrigation. Without the cradle 28, a cap or a similar structure needs to be placed on the discharge to achieve the same result. With a cap on the discharge, the flush cycle will not be able to perform. This principal is also true on the mini sprayer.

Figure 2:
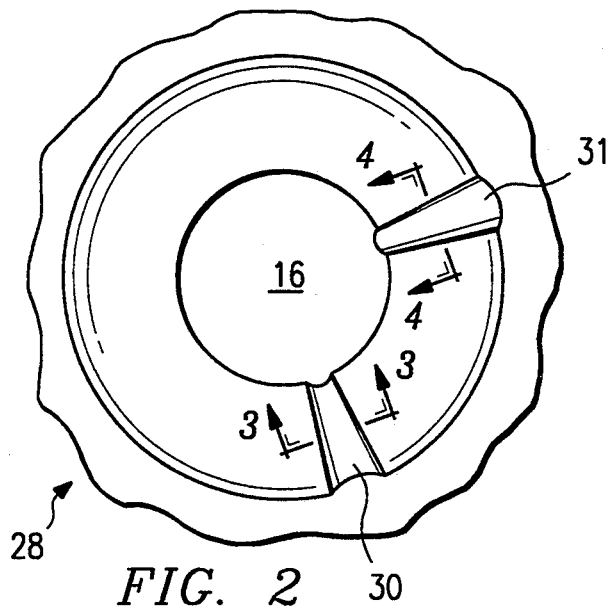
FIG. 2 is a cross-sectional view of a preferred feature in the present invention taken along line 2—2 in FIG. 1.
Figure 3:
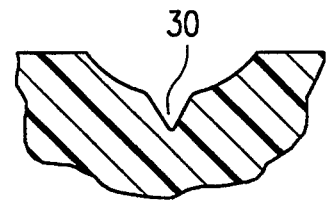
FIG. 3 is a cross-sectional view of the preferred feature taken along line 3—3 in FIG. 2.

Referring to FIGS. 2 and 3, cradle 28 further includes a slot 30. As shown more clearly in FIG. 3, slot 30 provides a small two-stage opening between dripper housing 14 and outlet 16. The slot 30 defines a V-shaped or a quarter moon-shaped (not shown) slot disposed below a larger quarter moon-shaped opening. The two-stage slot 30 makes the dripper adaptable to varying line pressures, especially lower line pressures such as fifteen psi or lower. Because of the two stage slot opening 30, at the upper wide shallow quarter-moon shape opening in conjunction with a soft ball 26, (approximately 50 durometer) the ball will be able to react to a minute pressure change to regulate the opening size. The second lower quarter-moon or V-shape opening is difficult to completely close up even during a very high irrigation line pressure such as forty psi or higher. This design is not only able to handle a greater range of water pressure, it is also much more accurate in compensating the pressure changes to permit the same amount of water to be delivered throughout the entire system.

Figure 4:
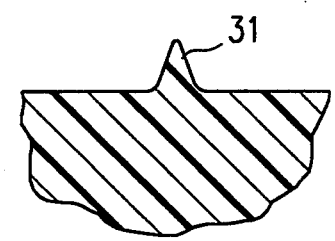
FIG. 4 is a cross-sectional view of an alternative embodiment taken along line 4—4 in FIG. 2.

The softer the dripper ball 26, the more sensitive to pressure change it is, but a harder ball (fifty durometer or higher) will have a better resistance to abrasion. A dripper ball 26 should not have a softness under 40 durometer for a commercial dripper. A very soft ball may also stick to the discharge opening. With the above in mind, the single slot opening cannot perform well in a wide range of water pressure, because a softer ball and a more deeply grooved opening is required. The two state slot opening is a much more workable solution. The function of slot 30 is described in detail below. Cradle 28 may define one or more slots. Alternatively, a generally convex feature may be employed. Referring to FIG. 4, a generally convex protruding ridge 31 is similarly situated on cradle 28. Ridge 31 effectively ejects the ball 26 away from the opening after water pressure returns to zero, and does not permit the ball 26 to be stuck there. The function of ridge 31 is further described below. A dripper 10 may employ a number of slots 30 or ridges or a combination of both, depending on the desired effects and application.

Figure 5:
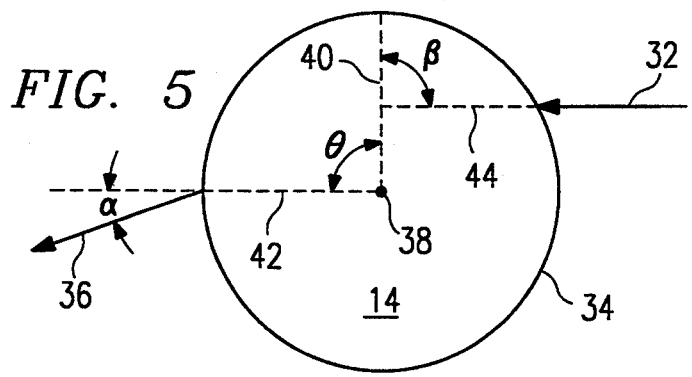
FIG. 5 is a schematic illustrating the preferred placement and orientation of dripper components.

Referring to FIG. 5, a schematic diagram is provided to illustrate the placement and orientation of inlet 12 and outlet 16 with respect to dripper housing 14. An arrow 32 depicts a centerline of inlet 12, a circle 34 depicts the general outline of dripper housing 14, and arrow 36 depicts a centerline of outlet 16. A center 38 of circle 34 is shown. Two radial lines 40 and 42 are shown to aid in locating the position and orientation of inlet 12 and outlet 16. Radial lines 40 and 42 are at an angle $\theta = 90°$ from one another. An imaginary line 44 can be drawn from a midpoint of radial line 40 to the perimeter of circle 34; line 44 being at an angle $\beta = 90°$ to radial line 40. Therefore line 44 in effect is perpendicular to radial line 40 and bisects it. Center line 32 of inlet 12 is an extension of line 44 beyond the perimeter. Center line 36 of outlet 16 extends from where radial line 42 intersects the perimeter at an angle $\alpha$ from radial line 42. Angle $\alpha$ is preferably an acute angle, as shown in FIG. 5. The geometry of dripper 10 as described is important to create the whirlpool inside the spherical chamber during the flush cycle. This function is described in more detail below. While the invention has been described in detail above, dripper 10 may be configured in a different but comparable geometry without departing from the teachings of the invention.

Referring to FIG. 6, a preferred embodiment of mini-spray 50 is shown. Mini-spray 50 includes an inlet 52, a housing 54 and an outlet 56. Inlet 52 defines a narrow passageway 58 which acts to receive water or other liquids. Inlet 52 includes an annular barb construction 62 which acts to anchor against the irrigation hose wall (not shown). The manner in which inlet 52 is coupled to housing 54, the construction and function thereof are identical to that shown in FIG. 5 and in the discussions above related the dripper 10 shown in FIG. 1.

Housing 54 is generally spherical or ellipsoidal and contains a substantially free-roaming ball 66. The construction and function of ball 66 are also identical to that of dripper 10 and will not be repeated herein.

Outlet 56 is coupled to housing 54 generally in a manner similar to that of dripper 10, however, it is of a different structure and serves a different function. Outlet 56 includes a cradle structure 68 similar to that of dripper 10, having one or more slots and/or ridges as shown in FIG. 2 to provide small exit openings from housing 54. However, because of the increased volume in the spray application, the number of slots and/or ridges may be adjusted accordingly to compensate the pressure and predetermined discharge volume. In addition, the dimension of opening 60 of outlet 56 is reduced from that of dripper 10. The reduced opening size causes the water to exit in a spray pattern. As shown in FIGS. 6 and 7, opening 60 and outlet 56 can be constructed so that the water spray is more advantageously directed toward desired locations.

Referring to FIGS. 8 and 9, a further embodiment of a dripper or water dispenser 80 is shown. Dripper 80 has a housing 82, an inlet 84, and an outlet 85 constructed of similar material as described above. A reference line 88 is shown which serves as a generally horizontal radius for housing 82. Further, a centerline 90 is shown for inlet 84, and a centerline 92 is shown for outlet 85. The centerlines 90 and 92 do not bisect perpendicular radii (not shown) of housing 82 and are generally offset therefrom. Centerlines 90 and 92 are also offset from the center axis of housing 82. Inlet 84 generally lies below the center axis of the housing while outlet 85 generally lies above the center axis of the housing. As shown in FIG. 9, housing 82 is generally shaped like a flattened drum or cylinder standing vertically on its rounded side.

A ball 98 of similar construction and material as described above is contained within the housing 82. Additionally, an angled reflector pad 96 is positioned on a wall of housing 82 and disposed generally opposite of inlet 84. Inlet 84 includes an annular barb structure 102 for anchoring against an irrigation hose 112 into which inlet 84 has been inserted. The wall of the opening made in the irrigation hose 112 may rest against the narrowed portion 103 of inlet 84. The outlet 85 includes a cradle 106. Cradle 106 or reservoir is constructed similarly as those shown in FIGS. 2-4, and also functions similarly to reserve escape routes for the water either drip-by-drip or in a predetermined spray pattern.

Referring also to FIG. 5, which shows the orientation and geometry of an embodiment of the dripper, it can be seen that dripper 80 has a slightly different or reversed geometry. Centerline 90 of inlet 84 is positioned below the center axis of housing 82 and parallel with its radius reference line 88. The outlet centerline 92 is positioned above the center axis and parallel with its horizontal radius reference line 88. The position and orientation of inlet centerline 90 is used to manipulate the size and strength of the resultant whirlpool. This in turn determines the duration of the flush cycle. Constructed in this manner, water or other liquids entering the dripper 80 through inlet 84 directly impacts ball 98 and causes it to collide with angled reflector pad 96. Due to the angle of reflector pad 96, ball 98 bounces off reflector pad 96 and is guided to swirl around housing 82. Also due to angled reflector pad 96 and the position of intake line 90, a smaller and more energetic whirlpool is created, because the intake current is much stronger before it engages with the reflector 96 and changes into a whirlpool. The whirlpool is not able to pass beyond the intake line 90. Therefore, the intake line position is able to manipulate the size of the whirlpool. By co-ordinating the whirlpool size with the inlet or intake 84 an outlet 85 opening size, and the size and specific gravity of the dripper ball 98, the dripper ball 98 rotating pattern may also be manipulated. With all the above coordination, the very small dripper ball rotating pattern enables it to loose its balance and engage with the discharge cradle, within one or two seconds of flushing. This short duration allows the dripper 80 to be thoroughly flushed clean via higher velocity intake current, because the dripper 80 water intake opening size is generally ten times smaller than the line size of hose 112, and discharge any debris that might have accumulated there during previous irrigation cycles. This is also true of the mini-spary.

At the opposite side of the water intake 90 line, the dripper inner wall, without the angled reflector pad, does not have a sufficient angle to change the intake current to a forceful whirlpool, especially during low pressure situations. The reflector pad 96 is made to boost and direct the intake current upward, and salvage the beneficial energy from the intake current. With reflector pad 96 a more energetic whirlpool is created. This design will allow the dripper to work in a very low pressure system, as well as in a higher pressure system.

Dripper 80 further includes a lever arm 110. Lever arm 110 functions as a lever and stabilizer holding against the irrigation hose 112 and prevents any rotational motion of dripper 80.

Referring to FIGS. 10, 11, and 11a, an alternate embodiment 120 of the mini-spray or water dispenser is shown. Mini-spray is suited for orchard and vegetable farming applications where the crop is tall, and water application needs to be elevated in order to irrigate in a more uniform manner. Mini-spray 120 includes an inlet 124 with an annular barb as described above, an housing 122 of the same generally construction and shape as shown in FIGS. 8 and 9. Mini-spray 120 has a cradle and an outlet 126 of a similar construction as that shown in FIG. 6 and/or 7 as described above, but outlet 126 is positioned generally at a ninety degree angle from the centerline 125 of inlet 124. A ball 130 is similarly provided within the housing 122, along with the angled reflector pad 132, generally positioned directly opposite of the inlet 124. Mini-spray further includes a lever arm 128, generally oriented along the same reference line 138 as that of the outlet 126. Alternatively, outlet 126 may include a removable sprayer tip 139 which may facilitate cleaning out debris from the sprayer tip 139. A pressure compensated mini-sprayer is not only able to irrigate adequately with low water pressure with even distribution, but because with low pressure at the spray head (six to ten psi) it will discharge larger droplets within a small area. This is very important because larger droplets will not evaporate and have a lesser chance of being carried away by the wind.

Referring to FIGS. 11 and 11a, the mini-spray 120 is shown inserted through an opening 150 in a fitting 140, which is used to cap the top end of a pipe 144. The segment of the pipe 144 is inserted partially into the ground for securely holding the mini-spray 120 a predetermined distance above ground. Further, a length of spaghetti tubing 145, one end of which being inserted over the inlet 124, is used to guide water or other liquids from an irrigation line 146 up to mini-spray 120.

Figure 13:
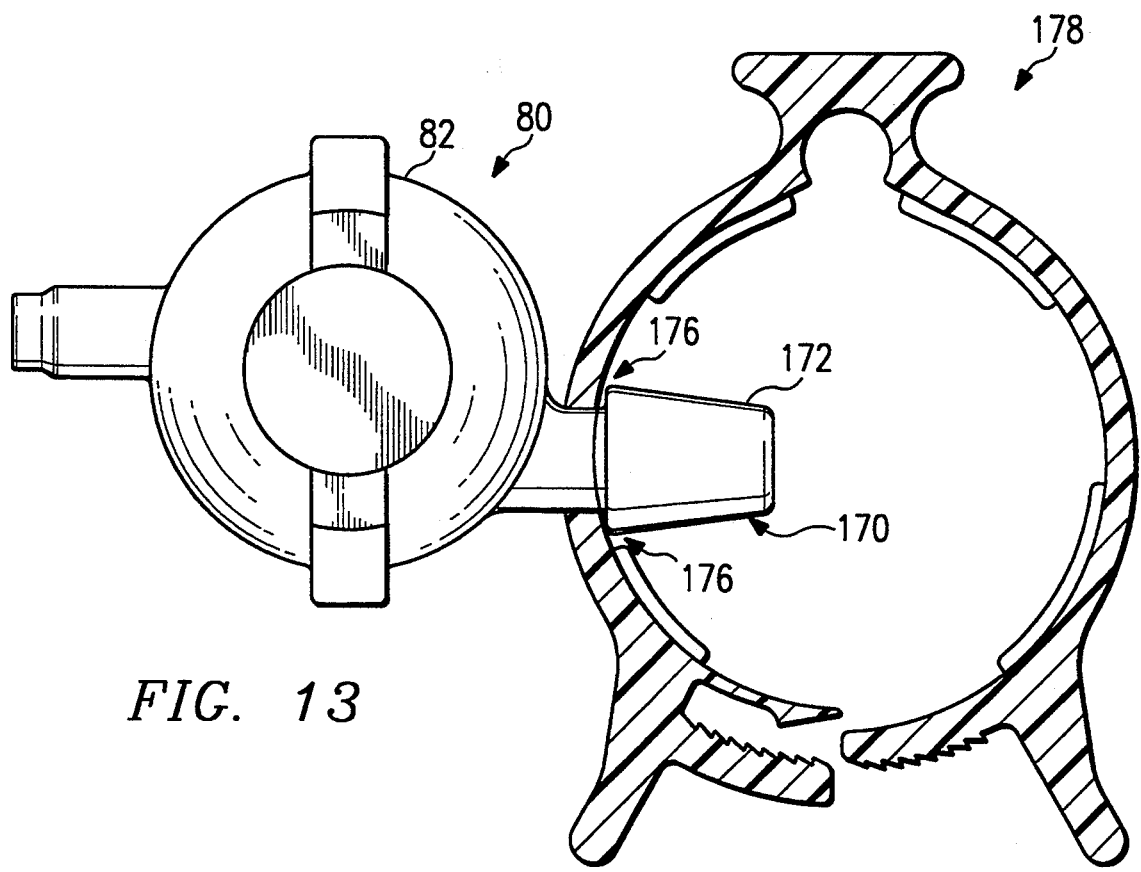
FIG. 13 is a partial elevational fragmentary view of the dripper in operation with the irrigation hose hanger.

Referring to FIGS. 12 and 13, a dripper 80 is shown in operation with an irrigation hose hanger 178, described in a related patent application Ser. No. 08/024,182, filed Feb. 26, entitled "Irrigation Hose Hanger." The entire genealogy of this application is described above and not repeated herein. Briefly, the irrigation hose hanger 178 is adapted to clip onto a suspended wire, and further clamp around an irrigation hose hanging below the wire. In this manner, the irrigation hose is held securely below the suspended wire, by the reusable hose hanger 178.

A slot opening 176 is created in one arm of the irrigation hose hanger 178, as shown. A generally elongated annular portion 172 of the inlet 170 is thus anchored against the inner surface of the hose hanger 178 arm, with the narrowed portion thereof fitting through the slot opening 176. As the hose hanger 178 is caused to tightly clamp around an irrigation hose 180, the inlet opening 170 is forced into an opening previously made in the hose 180, and tightly secured therein by the closed hose hanger 178. It can be seen that, the use of the hose hanger 178 causes the dripper 80 to be securely held in position. Furthermore, since the barb portion 172 is not entirely inserted into the opening in the hose 180, the inlet may be easily retreated therefrom without substantial damage to the hose wall and/or opening.

Operation of the Preferred Embodiment

In operation, dripper 10 is used in farms and orchards employing the drip irrigation method. In this method, irrigation hoses line each row of plants or trees and one or more drippers is used to deliver continuous drops of water to each plant or tree.

Dripper 10 may be attached to a desired location on the hose by first piercing the hose with a sharp object, such as a knife, a power drill, or a special hand tool. Inlet 12 is then pushed into the hole which is then anchored securely by annular barb 22. Dripper 10 may be oriented such that outlet 16 is substantially horizontal, or pointing substantially downward, or points in between.

At the beginning of each irrigation cycle, the water to the irrigation hoses are turned on, which creates a great water pressure in the system. Water fills the hoses and is forced into dripper housing 14 through narrow inlet passageway 18 at an even greater pressure and velocity. Due to the substantially spherical or ellipsoidal shape of dripper housing 14 and the orientation of the inlet and outlet, a small whirlpool is created therein, pushing dripper ball 26 about. In a short duration of time, water swirling around in dripper housing 14 effectively flushes out any debris or foreign matter accumulated in dripper housing 14 or the hoses through outlet 16. The flush cycle duration is generally determined by the geometry of the inlet 18 position, inlet 18 and discharge opening size ratio, size and specific gravity of the dripper ball 26, reflector pad angle, and line pressure. Preferably, the flush cycle lasts approximately one second which is sufficient to flush out most or all of the accumulated debris in the system. The flush cycle concludes as dripper ball 26 is forced toward outlet 16 and rests against cradle 28. This action initiates the drip cycle.

The drip cycle is characterized by the formation of drops of water at outlet 16 which drop to the soil to irrigate the plant or tree. Due to the water pressure in the line and dripper housing 14, dripper ball 26 is forced against cradle 28, effectively closing off outlet 16. However, water is able to escape dripper housing 14 through slot 30. The rate of water dripping from outlet 16 may be regulated by varying the line pressure. The higher the water pressure in the lines, the more forceful dripper ball 26 is pushed against cradle 28 and slot 30. Alternatively, dripper ball 26 is forced against ridge 31, which provides small openings on either side thereof. Thus depending on the flexibility and hardness of dripper ball 26 with respect to dripper housing 14 and/or cradle 28, the amount of water expended may be regulated effectively. This pressure compensation feature ensures an even distribution of water throughout the irrigation system, where water pressure may vary or may be affected by unlevel grounds. In view of the foregoing, it is preferable that dripper ball 26 be constructed of a flexible material, and dripper housing 14 and/or cradle 28 (including ridge 31, if any, thereon) be constructed of a somewhat harder material. Constructed in this manner, as water forces dripper ball 26 against cradle 28, small openings are made by slot 30 and/or ridge 31. Similar functions may be achieved by using a hard ball 26 and a softer cradle 28, or ball 26 and cradle 28 both made of a generally softer material. The materials used may be EPDM, hard plastic and the like.

The specific gravity of dripper ball 26 may be less than or greater than one. At the conclusion of the drip cycle, as both water pressure and level drop in dripper housing 14, dripper ball 26 will tend to float upward from cradle 28 toward the water surface or drop toward the bottom of dripper housing 14, depending on its relative specific gravity. In this manner, outlet 16 is once again unobstructed and able to discharge water. The water discharged at this time serves to perform additional flushing.

It is evident that the need to flush out the system is the greatest at the beginning of each irrigation cycle, because debris and foreign matter are generally accumulated when there is no water in the system. In the unlikely event that dripper 10 still becomes plugged, all that is required to restore it to working order is to free dripper ball 26 by inserting a blunt pointed pin into outlet 16. Accordingly, the self-flushing feature substantially eliminated disadvantages associated with prior drippers.

The spray application of dripper 10 or mini-spray 50 is operated in a similar manner. The discharge pressure is reduced and regulated as compared with the line pressure after the water has passed through openings in the cradle. The size of two stage slot opening 30 and the size of mini-sprayer discharge opening 60 or 126 are coordinated. Because it is a pressure compensated design it will allow the water pressure in the cradle 28 to remain at about six to ten psi. The low discharge pressure allows water droplets to form. Water droplets thus formed by mini-spray 50 are larger than those formed by conventional spray heads, which allows the water droplets to reach the soil rather than to be carried away by wind or evaporate. The spray application is especially beneficial in sandy soil conditions by producing a larger wet area around the plant and thus allowing more moisture to reach the feeder roots thereof.

The reverse orientation of the dripper in combination with the angled reflector pad, as shown in FIGS. 8–13, greatly contribute to the creation of a whirlpool of the desired size and duration. The water entering the dripper housing through the inlet, since it is aimed at the ball resting at the bottom of the housing, rushes at it and kicks it up at the front of the wave. A whirlpool is then created due to the reflector pad and the generally spherical and cylindrical shape of the housing. The desirable whirlpool causes the ball to swirl around and flushes out any debris trapped in the housing. Additionally, the whirlpool causes the ball to engage the cradle at the desire time. As discussed above, the timing at which the ball engages the cradle or reservoir is of great importance. Too long a time duration would lead to unnecessary loss of water; too short a time duration would cause incomplete or insufficient flushing of the housing interior.

The lever arm and the hose hanger configuration (shown in FIGS. 12 and 13) contribute to the secure installation of the dripper to the irrigation hose, and to prevent any rotation thereof. The hose hanger configuration further permits the dripper to be easily extracted from the irrigation hose with minimal damage to the hose opening. This feature avoids substantial enlarging of the hose opening due to repeated insertions and extractions of the barbed dripper inlet. The hose hanger configuration further prevents accidental removal of the drippers, especially during mechanical harvests.

The mini-spray shown in FIGS. 10–11a is implemented with an orchard or vegetable garden in mind. In such applications, the sprayer generally is required to be elevated two or more feet above the crop to ensure adequate and uniform wetting of the soil around each vegetation. Implemented in this manner, a segment of ordinary pipe, cut to the desired length, is used to elevate the mini-spray without using expensive stakes designed especially for this purpose.

Although the present invention has been described in detail, it should be understood that various changes, substitutions and alterations can be made thereto without departing from the spirit and scope of the present invention as defined by the appended claims.

What is claimed is:

1. An irrigation dripper, comprising:
   an inlet for insertion substantially horizontally into an irrigation line and defining a passageway having a centerline lying substantially horizontally and at a right angle from said irrigation line;
   a housing defining a generally cylindrical chamber having a center axis, said inlet passageway leading into said chamber and being substantially offset from and below said center axis;
   an outlet defining a passageway leading from said chamber, said outlet passageway having a centerline lying substantially horizontally and being substantially parallel with said inlet passageway centerline, said outlet passageway lying in a same plane as said inlet passageway, and being substantially offset from and above said center axis of said chamber; and
   a ball being free to roll about said chamber and adapted for substantially obstructing said outlet passageway after a whirlpool is created within said chamber for a predetermined time.

2. The irrigation dripper, as set forth in claim 1, further comprising a cradle defined at a junction between said chamber and said outlet passageway adapted for creating at least one opening between said ball and said cradle in a pressure-compensated manner.

3. The irrigation dripper, as set forth in claim 1, further comprising a lever arm coupled to said housing and extending outward at an angle to said inlet passageway, said lever arm lying substantially in the same plane as said inlet passageway.

4. The irrigation dripper, as set forth in claim 1, wherein said chamber further comprises an angled reflector pad disposed opposite of said inlet passageway.

5. The irrigation dripper, as set forth in claim 1, wherein said inlet further comprises an annular barb.

6. The irrigation dripper, as set forth in claim 5, including means for holding said annular barb tightly against an opening in said irrigation line without complete entry thereof.

7. An irrigation sprayer, comprising:
   an inlet for insertion substantially horizontally into an irrigation line and defining a passageway having a centerline lying substantially horizontally and at a right angle from said irrigation line;
   a housing defining a generally spherical chamber having a center point, said inlet passageway leading into said chamber and being substantially offset from and below said center point;
   an outlet defined in said housing, said outlet being disposed above and generally at a right angle with respect to said inlet passageway, said outlet lying generally in a same plane as said inlet passageway; and
   a ball being free to roll about said chamber and adapted for substantially obstructing said outlet after a whirlpool is created within said chamber for a predetermined time.

8. The irrigation sprayer, as set forth in claim 7, further comprising a lever arm extending downward substantially at a right angle to said inlet passageway.

9. The irrigation sprayer, as set forth in claim 8, further comprising a fitting for receiving said downward extending lever arm, said fitting being adapted for capping one end of a pipe inserted into the ground.

10. The irrigation sprayer, as set forth in claim 7, wherein said chamber further comprises an angled reflector pad disposed opposite of said inlet passageway.

11. The irrigation sprayer, as set forth in claim 7, wherein said inlet further comprises an annular barb adapted for secure insertion into an irrigation tubing.

12. The irrigation sprayer, as set forth in claim 7, further comprising a cradle defined at a junction between said chamber and said outlet adapted for creating at least one opening between said ball and said cradle in a pressure-compensated manner.

13. The irrigation sprayer, as set forth in claim 12, wherein said cradle is adapted for creating a spray pattern.

14. The irrigation dripper, as set forth in claim 7, wherein said chamber is spherical having two flattened sides equidistant form and parallel with said inlet centerline.

15. The irrigation sprayer, as set forth in claim 7, further comprising a removable sprayer tip.

16. A pressure compensated irrigation water dispenser, comprising:
   an inlet having a passageway for insertion into an opening in a water irrigation line;
   a generally spherical housing coupled to said inlet passageway, said inlet passageway being generally offset from a center axis of said cylindrical housing;
   an outlet coupled to said housing and being generally disposed opposite of said inlet passageway;

a cradle defined at a junction between said housing and said outlet, said cradle adapted to function as a reservoir for relieving high water pressure in said housing;

said cradle further defining at least one two-stage slot by defining a small opening below a larger opening; and a free-rolling ball disposed inside said housing, said ball being swirled about inside said housing by water entering through said inlet, and being adapted for resting against said cradle after a predetermined time period, said at least one two-stage slot permitting water to escape said housing between said ball and said cradle.

17. The pressure compensated irrigation water dispenser, as set forth in claim 16, further comprising a lever arm extending downward for securing against said water irrigation line.

18. The pressure compensated irrigation water dispenser, as set forth in claim 16, further comprising a hose hanger for securing said irrigation water dispenser against said water irrigation line.

19. The pressure compensated irrigation water dispenser, as set forth in claim 16, wherein said housing defines an angled reflector pad therein and disposed opposite of said inlet passageway.

20. The pressure compensated irrigation water dispenser, as set forth in claim 16, wherein said cradle and said at least one two-stage slot are adapted for producing a water spray emitting from said outlet.

21. The irrigation sprayer, as set forth in claim 16, wherein said generally spherical housing is a sphere having two flattened sides equidistant from and parallel with a centerline of said inlet.

* * * * *